F. A. MILLS.
COMBUSTION ENGINE STARTING DEVICE.
APPLICATION FILED FEB. 17, 1912.

1,191,529.

Patented July 18, 1916.
7 SHEETS—SHEET 1.

Fig. I.

Witnesses:
Roswell F. Hatch.
Beatrice T. Smith.

Inventor:
Francis A. Mills
By Robt. P. Hains
atty.

F. A. MILLS.
COMBUSTION ENGINE STARTING DEVICE.
APPLICATION FILED FEB. 17, 1912.

1,191,529.

Patented July 18, 1916.
7 SHEETS—SHEET 4.

Witnesses:
Powell F. Hatch
Beatrice F. Smith

Inventor:
Francis A. Mills
By Robt. P. Hains
Atty.

F. A. MILLS.
COMBUSTION ENGINE STARTING DEVICE.
APPLICATION FILED FEB. 17, 1912.

1,191,529.
Patented July 18, 1916.
7 SHEETS—SHEET 5.

Witnesses:
Roswell F. Hatch
Beatrice T. Smith

Inventor:
Francis A. Mills
by Robt. P. Hains
Atty.

F. A. MILLS.
COMBUSTION ENGINE STARTING DEVICE.
APPLICATION FILED FEB. 17, 1912.

1,191,529.

Patented July 18, 1916.
7 SHEETS—SHEET 7.

Witnesses:

Inventor:
Francis A. Mills
by Robt. F. Haines
atty.

UNITED STATES PATENT OFFICE.

FRANCIS A. MILLS, OF LYNN, MASSACHUSETTS.

COMBUSTION-ENGINE-STARTING DEVICE.

1,191,529.  Specification of Letters Patent.  Patented July 18, 1916.

Application filed February 17, 1912. Serial No. 678,276.

*To all whom it may concern:*

Be it known that I, FRANCIS A. MILLS, a citizen of the United States, residing at Lynn, in the county of Essex and State of Massachusetts, have invented an Improvement in Combustion-Engine-Starting Devices, of which the following description, in connection with the accompanying drawings, is a specification, like letters on the drawings representing like parts.

The invention to be hereinafter described relates to starting devices for combustion engines and more particularly to that type of such devices wherein initiation of the engine action is effected through manually operated means.

By those skilled in the the art it is a well recognized fact that the manual manipulation necessary to put a combustion engine in operation presents one of the main objections incident to the use of such motors, not only by reason of the strenuous manual effort required to turn the engine, but the danger attending the effort. With respect to the first of these reasons various attempts have been made to provide means whereby such manual effort might be more conveniently applied to the crank shaft to thereby start the engine in its cycle of operations, and to lessen the power necessary to turn such shaft the cylinder or cylinders have been provided with pet cocks which could be opened during the starting action and subsequently closed. By thus opening the pet cocks the compression stroke of the engine was relieved somewhat, but on the other hand, and during the suction stroke air would rush into the combustion chamber and so far weaken the mixture drawn through the carbureter as to render it ineffectual. With respect to the second of the above reasons, namely:—the danger attending the manual effort, it is well understood that at times the engine, instead of turning forward or in the direction proposed by the manual effort, will, upon ignition of the mixture, turn in the opposite direction or give a "back kick" with the result that the operative may be injured. This may be due to one or more of several causes, as for instance the spark being too far advanced, in which case the combustion mixture becomes ignited before the piston reaches the end of its compression or up stroke in which case the engine will be moved backward or "kick back." This improper action of the engine has been the cause of much objection to its use, and has resulted in serious injuries.

With the above facts in mind the aims and purposes of the present invention will best be made clear from the following description and accompanying drawings of one form of means for carrying the invention into practical effect, it being understood that the invention is not limited to the details of the said means but in its true scope is definitely pointed out by the claims.

It is also to be understood that while in the following description and accompanying drawings the invention is associated with the combustion engine of an automobile, it is not restricted thereto, but may be employed in connection with any combustion engine to which it may be adapted, as for instance that of a motor boat, flying-machine or even a stationary motor, so that in the following explanation and claims, where reference is made to an automobile, it is to be understood that the term is one for convenient description only, and not of limitation.

The automobile body 1 may be of any character and suitably sustained by the usual front and rear wheels, only the front wheels 2, 2, being shown in the drawings. The wheels 2, 2, are mounted upon the usual axle 3, and are connected to the usual steering wheel 4 by which the vehicle may be guided; but as these features, as well as the mounting of the rear wheels and their driving connection to the engine, are well understood in the art, and form no essential part of the present invention, further detail description and illustration thereof are unnecessary.

Figure 1:
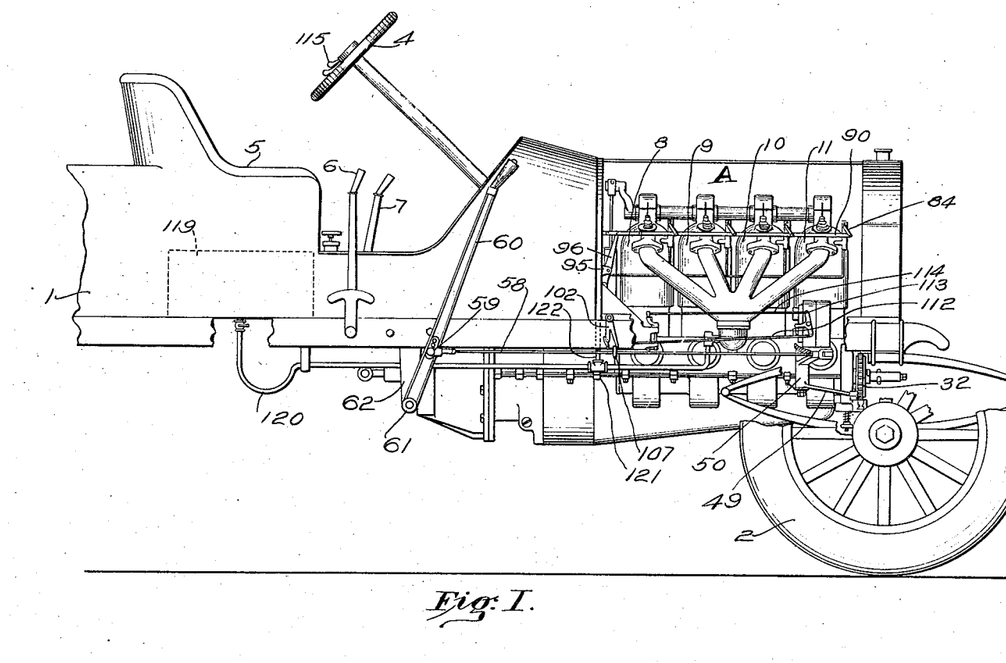
Figure 1 is a side elevation of a portion of an automobile showing the present invention applied thereto, some of the parts being broken away to illustrate the structure beyond.

In Fig. 1, the seat on which the operative may sit is indicated at 5, and the hand levers 6 and 7 which are within convenient reach are or may be connected respectively to the transmission and emergency brake, but as such constructions form no part of the invention and are well understood by those skilled in the art, further explanation is not required.

The engine A (Fig. 1), which is of the combustion type, is shown as comprising four cylinders, 8, 9, 10 and 11, preferably of the well-known four cycle type, each of which is connected to a source of fuel supply, such for instance, as gasolene, which is furnished each cylinder in the usual manner through a carbureter in answer to the suction stroke of the respective pistons. These features, as well as the valves and spark plugs or other ignition means may be all as usual or of any preferred type.

Figure 7:
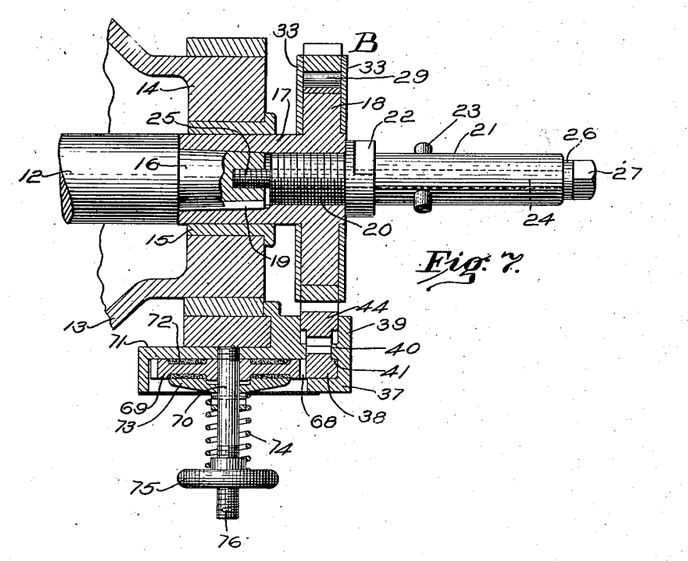
Fig. 7 is a section on the line 7—7 (Fig. 4).

Extending longitudinally below the cylinders 8, 9, 10 and 11 is the engine or crankshaft to which the pistons may be connected in any usual manner as by the ordinary piston rods, the forward end of said shaft being indicated at 12 (Fig. 7). The engine bed or casing 13 (Fig. 7) furnishes a support 14 for the projecting end of the shaft 12, and to this end is provided with a bearing 15. The end of the shaft 12 adjacent this bearing 15 is connected to one member of a clutch B, (Fig. 7). As one convenient form for such connection the end of the shaft 12 is preferably reduced in diameter and formed tapering as at 16 (Fig. 7), and to such tapering end of the shaft is secured to rotate therewith the hub 17 of the clutch member 18 by means of the key or spline 19. Secured to the clutch member 18 by suitable means, such for instance as the screw threads 20, is the hollow stud or arm 21 having the collar 22 and pin 23, the construction being such that, if desired, a crank handle or arm may be employed to turn the engine or crank shaft 12 under some conditions.

Passing through the hollow stud or arm 21 is a pin 24 which may be screw-threaded into the end of the shaft 12, as at 25, and having a washer 26 and head 27 whereby the clutch member 18 may be conveniently held from end-wise movement while being rotatable with the shaft 12. While the described construction furnishes a convenient means for maintaining the described parts in their desired relation, it is to be understood that the invention is not restricted thereto, and that this relation of the parts may be maintained by a device other than described and yet be fully within the invention as defined by the claims.

The clutch B may be variously formed, but the following has been found to be a good practical form, because while the members may be readily locked for rotation in unison, they may be as readily unlocked, as will presently appear. The clutch member 18, which may be conveniently termed the fixed clutch member, is provided at one or more points about its periphery, with a recess 28, (Figs. 4, 8 and 17), of greater depth at one end than the other and forming a seat for a ball or roller 29, normally under the action of a spring 30 tending to move the roller or ball toward the smaller end of the recess, a hardened metal plate 31 being preferably employed at the bottom of said recess. This recess 28 extends from its larger to its smaller depth in the direction of rotation of the engine, or crank shaft 12 and perforce of the fixed clutch 18 when the engine is in operation, as indicated by the arrow (Figs. 4, 8 and 17).

Figures 4, 5, 6:
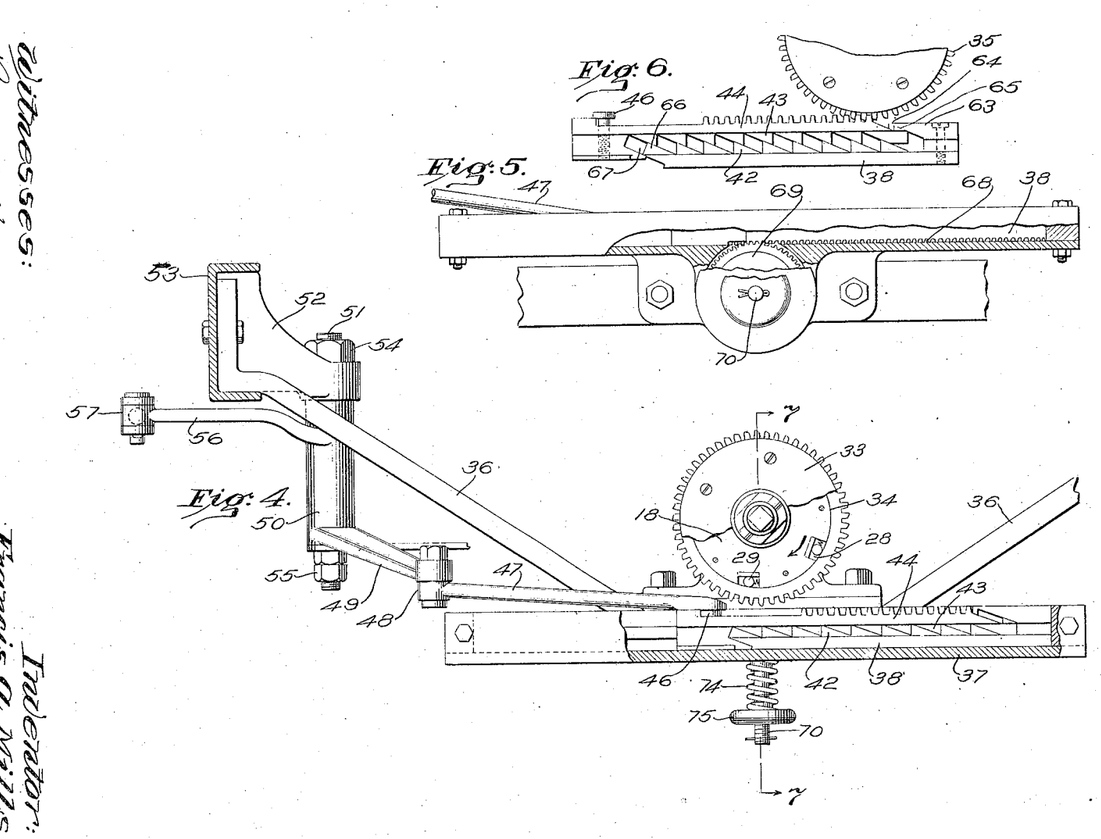
Fig. 4 is an enlarged detail view of portions of the starting device, some of the parts being broken away.
Fig. 5 is an under side view of the parts shown by Fig. 4, the bell crank levers and their connections being omitted.
Fig. 6 is a detached view showing details of the starting device, some of the parts being broken away.
Figure 8:
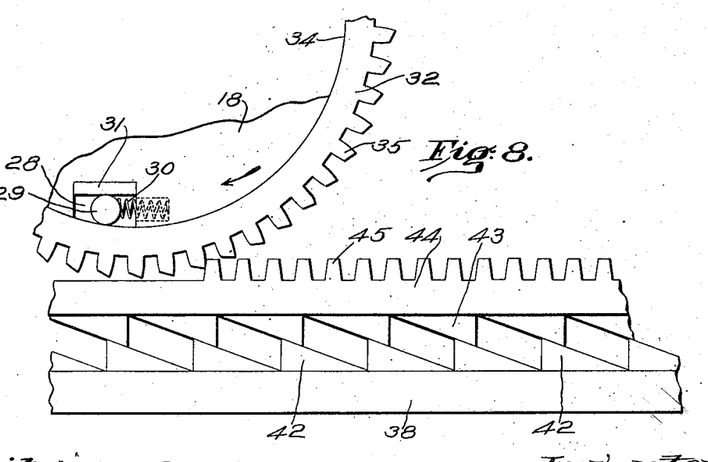
Fig. 8 is an enlarged detached detail practically full size, showing engagement of the starting device with the starting clutch member.
Figures 16, 17, 18:
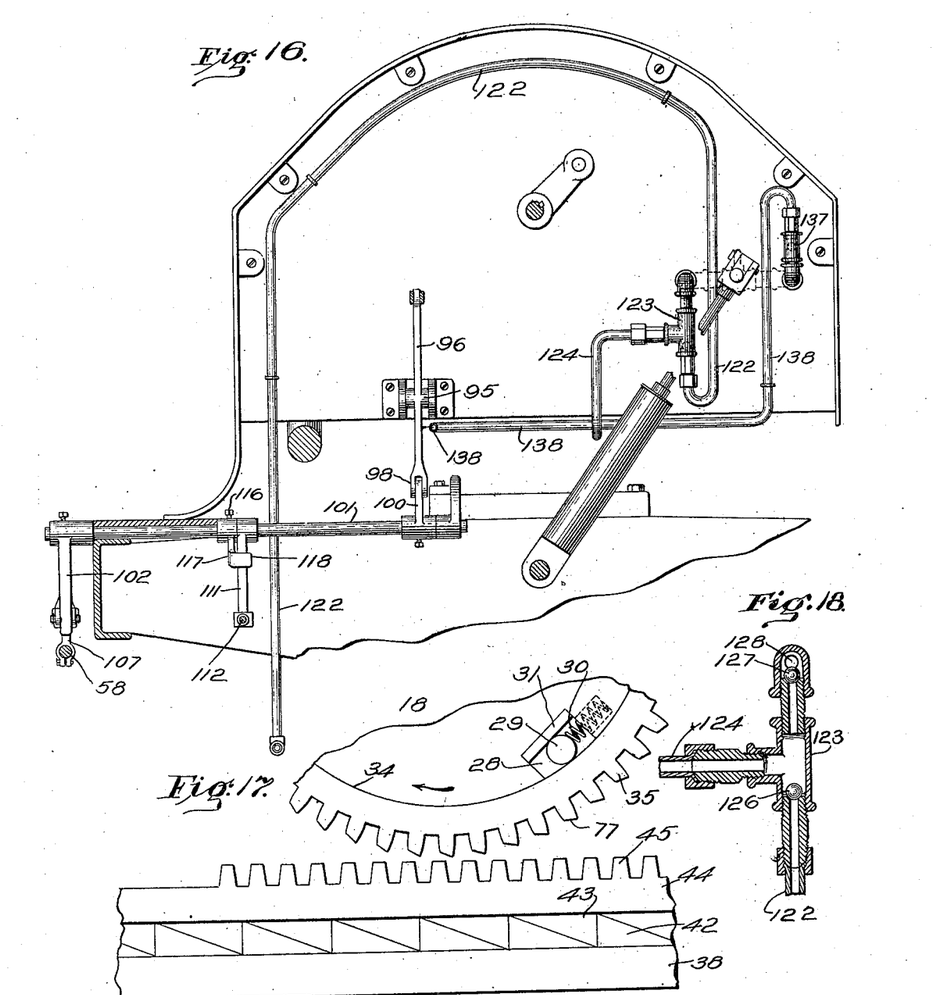
Fig. 16 is a front elevation of the dashboard looking from the front of the machine.
Fig. 17 is a view similar to Figs. 8 and 13, with the parts in another position.
Fig. 18 is a view in section of the ball valve and connections leading from the tank to the pump and auxiliary supply.

Loosely mounted upon or about the periphery of the fixed clutch member 18 is the loose clutch member 32, preferably confined in place by the face plates 33, (Figs. 4 and 7), secured to the sides of the fixed clutch member, and having the inner surface 34 of said loose clutch member plane or substantially smooth, (as indicated in Figs. 4, 8 and 17), the construction being such that while the fixed clutch member 18 may freely rotate in the direction of crank shaft movement, as indicated by the arrows in Figs. 4, 8 and 17, without carrying with it the loose clutch member 32, yet upon rotative movement of said loose clutch member in the same direction, the balls or rollers 29 will cause said clutch members to be locked for rotative movement together in the direction of said arrows, as will be readily understood. Rotative movement of the fixed clutch member 18 in a direction opposite to the said arrows will, similarly, cause a backward movement in the same direction of the loose clutch member 32.

The clutch member 32 is provided with a series of teeth 35 which are adapted to be engaged by the teeth of a starting actuator as will presently appear. From the construction described, it will be apparent that upon movement of the loose clutch member 32, which for identification may be hereinafter denominated the toothed clutch member, in the direction of the arrow (Figs. 4, 8 and 17), said toothed clutch member will be locked temporarily to the fixed clutch member and cause rotative movement thereof and of the crank shaft in the same direction.

Mounted upon or depending from the main frame of the machine and preferably supported therefrom by the braces 36, (Fig. 4), is an actuator support 37 extended transversely of the crank shaft. Mounted upon the support 37 is the starting actuator comprising two members which are relatively and conjointly movable longitudinally on the said support. These two members of the starting actuator may be variously arranged with respect to each other, but as shown in the present form of the invention the lower member 38 of the actuator is adapted to slide on the support 37 in a longitudinal direction or transversely of the crank shaft, and to maintain said lower member 38 upon the support 37, and restrain it from bodily upward movement with respect thereto the side portion 39 of the support 37 is provided with a flange 40 which overlies a shoulder 41 extending longitudinally of the member 38, as indicated in Fig. 7. The lower member 38 of the actuator is provided with a series of inclines 42 which are adapted to engage similarly inclined portions 43 on the upper member 44 of the actuator, the construction being such that upon relative movement of the upper and lower members of the actuator the upper member 44 will be caused to rise or move bodily away from the lower member 38.

Figures 11, 12, 13:
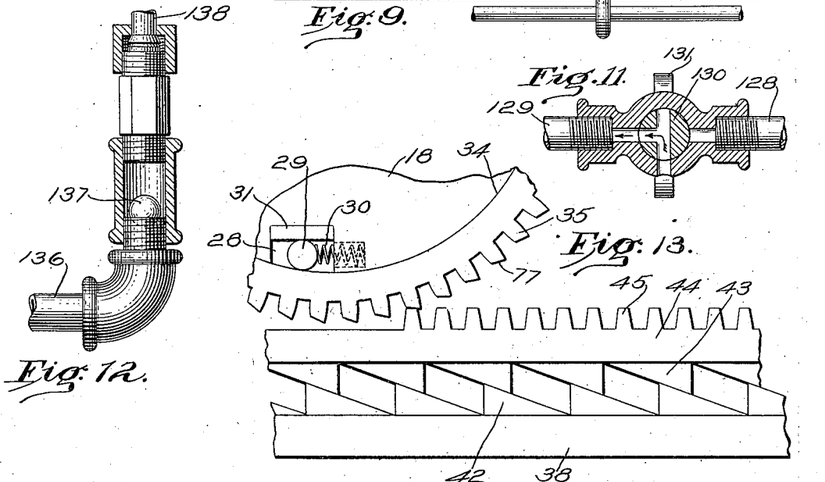
Fig. 11 is a section showing the three way cock on the auxiliary supply.
Fig. 12 is a section of a ball valve in the auxiliary supply.
Fig. 13 is a view similar to that of Fig. 8, showing the relation between the teeth of the starting member and the clutch member when they do not directly engage as is Fig. 8.

The upper member 44 of the actuator is provided with a series of teeth 45 which are adapted to engage the teeth 35 of the toothed clutch member 32 when the said member 44 of the actuator is thus relatively moved with respect to the lower member 38, as indicated in Figs. 4, 8 and 13. For convenience of identification, the upper member 44 of the actuator will hereinafter be referred to as the toothed member of the actuator.

Connected to the toothed member of the actuator at 46, (Figs. 4 and 6), is a link 47 jointed at 48 to the arm 49 projecting from a sleeve 50 supported upon a stud 51 which is itself securely clamped to a bracket 52 fast to the main frame 53. The stud 51 is preferably screw-threaded as indicated in Fig. 4 and the sleeve 50 is held thereto and in operative position by means of suitable nuts 54 and 55. Also projecting from the sleeve 50 is an arm 56 connected at 57 to a rod 58, (Fig. 1), which is itself connected at 59 to a starting lever 60 pivoted at 61 to a bracket 62 depending from the main frame or other convenient fixed support. The sleeve 50 and its associated arms 49 and 56 constitute a bell crank lever operatively connected to the starting lever 60 by the rigid connection 58, the construction being such that upon movement of the starting lever 60 about its fulcrum 61 the rod 58 and, perforce, the toothed member of the actuator will be given corresponding movement.

It will be noted that the engaging inclines 42 and 43 of the two members of the actuator are so disposed with reference to each other that upon movement of the toothed member of the actuator to the left, (Figs. 4, 6, 8 and 17), the toothed member of the actuator will ride upward thereby bringing its teeth 45 into operative engagement with the teeth 35 of the toothed member or wheel 32 of the clutch. After such engagement has been effected, as indicated in Figs. 6 and 8, further bodily upward movement of the toothed member is arrested, whereupon further movement of the actuating lever 60 to the left will cause the two members of the actuator to be moved in unison thereby while maintaining the teeth of the actuator in operative engagement with the teeth of the loose clutch member, causing by the conjoint movement of the two members of the actuator, rotative movement of the loose clutch member and through the clutching devices hereinafter described, a corresponding movement of the fixed clutch member and the crank shaft.

The described movement takes place on movement of the actuating lever 60 to the left, (Fig. 1), and upon reverse movement of the actuating lever 60, that is to the right, (Fig. 1), the toothed member of the actuator will first move to the right relatively to the second member of the actuator, and by virtue of the inclines 42 and 43 it will simultaneously move downward out of engagement with the teeth 35 of the toothed clutch member until the abrupt portions of the inclines 42 and 43 become engaged, whereupon, both the toothed and lower members of the actuator will move conjointly to the right.

Should the combustion engine produce a "back kick" while moving the actuating lever 60 to the left, (Fig. 1), it will cause the toothed member 44 of the actuator to move a short distance longitudinally and down the inclines 42 and 43 out of engagement with the loose clutch member 32. The amount of this movement is only such as to disengage the teeth of the loose clutch member and the toothed actuator, such movement being effected without injurious effect to the operative even though he maintains his hold upon the actuating lever 60.

The two members of the actuator are preferably so connected that only a limited relative movement of the two may be possible, and as one means to this end the lower member of the actuator (see Fig. 6), is provided with an end portion 63 having a hook or projection 64 adapted to engage a similar hook or projection 65 on the toothed member of the actuator when said members have been relatively moved the desired extent. The part 63 also serves as a means for maintaining the two members of the actuator in their assembled relation, and this may be further augmented by the projection 66, (Fig. 6), on the lower member of the actuator engaging a recess 67 of appropriate shape and extent on the toothed member of the actuator.

While the construction of the two parts of the actuator as hereinbefore described, is found to be a good practical embodiment of the invention, it is to be understood that the invention is not limited to these details.

As hereinbefore pointed out, the two members of the actuator are relatively and conjointly movable longitudinally and during such relative movement the toothed member is caused to engage suitable connections with the crank shaft to become operatively engaged therewith, whereupon the conjoint movement of the two members takes place longitudinally and rotative movement is thereupon imparted to the crank shaft. In such construction, it is desirable that the lower member of the actuator be restrained from free longitudinal movement and to this end the invention contemplates the provision of means to retard its movement. As one convenient form of means to this end, the lower member 38 of the actuator is provided with teeth 68 along one of its sides, as indicated in Figs. 5 and 7, said teeth being engaged by the teeth of a rotary friction disk 69 mounted upon a stud 70 projecting from a fixed part 71 of the main frame, as indicated in Fig. 5. The disk 69 is preferably provided with friction material 72, such as felt or the like, upon which bears a friction piece 73, (Fig. 7), mounted upon the stem 70 and normally under the action of a spring 74 interposed between the said piece and a hand wheel 75, (Fig. 7), screw-threaded to the said stem. A cotter pin 76 passed through the end of the stem 70 serves as a guard against the loss of parts, should they become loose.

From the construction described, it will be apparent that owing to the fact, in part at least, that the lower member 38 of the actuator is restrained from free longitudinal movement, it will remain stationary during the first part of the longitudinal movement of the toothed member of the actuator, or until said toothed member has engaged the loose member of the clutch, whereupon said toothed member being no longer free to move bodily away from the lower member, said lower member then partakes of the movement of the toothed member, and said members then move in unison to effect rotary movement of the clutch.

Referring to Fig. 13 it will be noted that the teeth 35 of the loose clutch member 33 have their end portions chamfered off or cut away as at 77, the construction being such that when the said teeth are in position to be engaged by the teeth of the actuator, their surfaces 77 are substantially parallel to the top surfaces of the teeth of the actuator. By virtue of this fact, should the teeth 45 of the actuator engage the ends of the teeth 35 during the independent movement of the toothed member of the actuator, the bodily rising movement of the actuator will be temporarily restrained, whereupon the toothed member and lower member of the actuator will move in unison until the teeth of the actuator pass into the space between the teeth of the loose clutch member, at which time the toothed member of the actuator is again free to move bodily away from the lower member and will thus move independently of the lower member to cause the desired engagement of the teeth of the actuator and loose clutch member, whereupon both members of the actuator will again move in unison to cause rotative movement of the crank shaft.

Upon manual manipulation of a combustion engine to effect starting, much effort is needed unless some form of relief is provided for the cylinder or cylinders during the compression stroke. On the other hand, however, during the suction stroke the relief valve or valves should be closed, otherwise a poor mixture will be drawn into the cylinder or cylinders by reason of the inrush of air through such valve or valves. Moreover, the relief valve or valves should be opened upon operation of the starting device and should be closed after the engine has been effectively started, while at the same time such relief valves should be so devised that upon compression stroke little opposition will be offered the piston, while on suction stroke the ingress of air through the relief valves into the cylinders should be prevented. The present invention contemplates features whereby the desired results are effected through actuation of the starting device, as will be explained.

Figures 14, 15:
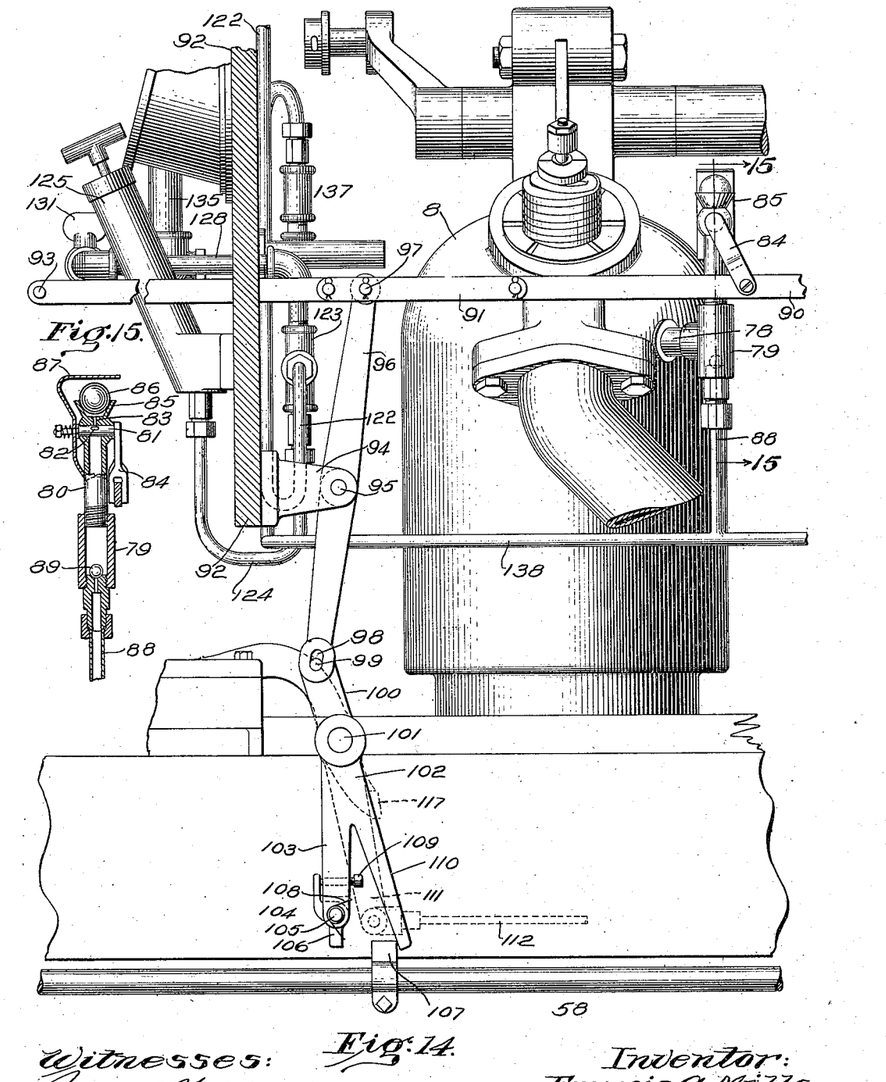
Fig. 14 is an enlarged view showing one cylinder, the pet cock operating device and starting rod with their associated parts.
Fig. 15 is a section on the line 15—15 (Fig. 14).

Since the parts associated with each cylinder may be alike, it will be sufficient to refer to one only, as indicated in Fig. 14.

The cylinder 8 has connected thereto a relief valve or pet cock, and as one form thereof there is leading into the cylinder at the top portion thereof, an inlet 78 projecting from an upright or other form of tube 79, as best indicated by Figs. 14 and 15.

Projecting from the tube 79 is the tube 80 having at its upper portion the pet cock 81. This pet cock 81 may be preferably formed as a stem having an opening 82 and passing transversely through the upper portion of the tube 80, said opening 82 being adapted to register at times with an opening 83 (Fig. 15) at the top of the tube 80. From the construction so far described, it will be apparent that when the pet cock 81 or other form of valve is turned in one direction by means of the attached arm 84, the openings 82 and 83 will be brought into alinement and when turned in the opposite direction they will be closed to the passage of air or gas therethrough.

At the top of the tube 80 there is a seat 85 (Figs. 14 and 15) for a ball valve 86 which is retained loosely upon its seat to prevent loss of the ball valve, by a guard 87 which projects over and above the ball 86. The part 79, hereinbefore referred to, (see Figs. 14 and 15) has connected at its lower end a tube 88, communication between said tube 88 and the part 79 being controlled by the ball valve 89, as best shown by Fig. 15.

From the construction described as one form of the present invention, it will be apparent that if the pet cock 81 be opened to establish communication between the passageways 82 and 83, and the crank shaft of the engine be then turned, that upon the upstroke of the piston, which is the compression stroke, air or gas can readily pass through the pet cock and thus relieve the compression that would otherwise occur. On the down or suction stroke of the piston, however, the ball 86 will be seated upon the seat 85 and effectively close the passageways 82 and 83 against ingress of air to the cylinder, with the result that the charge of mixture sucked into the cylinder by the down stroke of the piston will be of the desired rich character and be not weakened by superfluous air. Thus, also, on the upstroke of the piston the power necessary to turn the crank shaft is lessened and more free hand manipulation of the starting device is thus effected.

The present invention contemplates that the above action of the relief valve or pet cock be secured by movement of the starting device or its actuating means and to this end the arm 84 of the pet cock is connected to a rod 90 (Fig. 14), it being understood that the rod 90 may extend along the entire series of cylinders and be connected to the arm 84 of each pet cock or relief valve. The rod 90 has a linked portion 91 in its length and extends forward through the dashboard 92 (Fig. 14), in position to be conveniently grasped at 93 by the operative on the seat 5 of the machine.

Pivoted to a bracket 94 projecting forwardly from the dashboard 92 (Fig. 14) as at 95, is a lever 96 the upper end of which is connected at 97 to the relief valve operating rod 90. At its lower end the lever 96 is provided with a slot 98 which engages a pin 99 on an arm 100 secured to a rock shaft 101, (Figs. 14 and 16). Secured to the rock shaft 101 and projecting downwardly therefrom is a bifurcated or forked arm 102, carrying on its arm or bifurcated portion 103 a trip 104 mounted on a pin 105 and having its lower end $10^a$ projecting into the path of movement of a stop 107 secured to the starting rod 58, (Fig. 14). The trip 104 is normally under the influence of a spring 108 which maintains it substantially in the position indicated with its upper end resting against the adjusting screw 109. The other end or forked arm 110 extends downwardly into a position to be engaged by the stop 107 when the rod 58 is moved to the right, (Fig. 14), the construction being such that upon movement of the actuating lever 60 to the left, (Fig. 1), and consequent similar movement to the starting rod 58, the stop 107 will contact with the trip 104, turning the shaft 101 and with it the arm 100 which, through the lever 96 will move the relief valve operating rod 90 in a direction to open such valves, so that upon manual manipulation of the starting device the relief valves or pet cocks are opened in the manner hereinbefore stated to minimize the manual power necessary to turn the engine or crank shaft. After the engine has been started, the starting lever 60 may be moved to the right, (Fig. 1), thereby also moving the starting rod 58 in the same direction, at which time the stop 107 having been moved past the trip 104 owing to the extent of movement of the starting rod 58, will trip past the said trip and engage the arm 110 and close the relief valves or pet cocks. Thus on operating the starting device the relief valves or pet cocks are also operated to effect the desired ease of movement of the engine and, after the engine has been started and the starting device is moved in the opposite direction, the relief valves or pet cocks will be closed for power at the actuation of the engine. Also during hand manipulation to start the engine, the peculiar form of relief valve and its associated ball valve will permit release of compression during the compression stroke of the engine, but prevent ingress of air during the suction stroke.

Not only are the above-stated conditions of the relief valve and starting device desirable or essential in the proper manual starting of a combustion engine, but the ignition or sparking device should, during hand manipulation of the engine, be retarded; that is the charge in the cylinder should not be ignited until after the piston has reached the full extent of its up or compression stroke. If the spark were advanced and the mixture was caused to be ignited before the piston reached the end of its up or compression stroke, the engine would probably give a "back kick", and while "back kick" in the present invention may be substantially neglected on account of the automatic disengagement of the actuator and clutch on occurrence of such "back kick", yet the present invention also contemplates retardation of the spark or ignition device during and by virtue of the movement of the manual starting device. To these ends the shaft 101 has loosely mounted thereon, a depending arm 111, (Figs. 14 and 16) which is connected by the rod 112, (Figs. 14 and 16), to the magneto controlling device 113 (see Fig. 1), said controlling device 113 being likewise connected by the rod 114 to the usual switch or hand-piece 115, (Fig. 1) convenient for the operative.

Secured to the shaft 101 as by the set screw 116, (Fig. 16) is an arm 117 having an end 118 embracing the depending arm 111, hereinbefore described, the construction being such that upon the actuation of the starting lever 60, (Fig. 1), by movement thereof to the left and the consequent similar movement of the starting rod 58, the shaft 101 will turned clock-wise (Fig. 14), thereby moving the arm 117 in a similar direction and moving the rod 112 connected to the sparking device to the left, (Fig. 14), thereby retarding the spark.

From the construction thus far described, it will be apparent that, upon actuation of the starting lever 60 not only are the relief valves or pet cocks of the cylinders opened and the engine shaft given a manual turning movement, but the sparking device is by the same movement of the starting lever retarded to thereby guard against premature ignition of the mixture in the cylinder, and by the loose mounting of the arm 111, (Figs. 14 and 16) upon the shaft 101 the sparking device still remains under free control of the hand operated lever 115 after the starting device has effected proper operation of the engine and been returned to its former position.

It is sometimes desirable in combustion engines, to prime the cylinders, or inject thereinto a small quantity of the fuel, and to this end the present invention contemplates the provision of an auxiliary fuel supply which will permit the engine when operated by manual power, to suck into the cylinders during the suction stroke, the desired supply of fuel provided the operative previously manipulates means permitting this suction action of the engine upon the auxiliary supply.

As hereinbefore noted the part 79 of the relief valve connection with the cylinder is connected to a pipe 88 normally closed by the ball valve 89, (Fig. 15). This pipe and its connections constitute the auxiliary fuel supply, hereinbefore mentioned, and to this end are maintained full of liquid fuel, as will now be described.

Extending from the fuel tank 119, (Fig. 1), which may contain any suitable liquid fuel, such as gasolene, is a pipe 120 leading to the carbureter as usual, and connected to said pipe at 121, (Fig. 1) is a pipe or conduit 122, (Figs. 1, 14 and 16) which leads about the front of the dashboard 92, (Fig. 16) through the double ball check valve 123, and then by a pipe 124, (Figs. 14 and 16 and 9) to a hand pump 125 in convenient position on the dashboard or other suitable location.

Figures 9, 10:
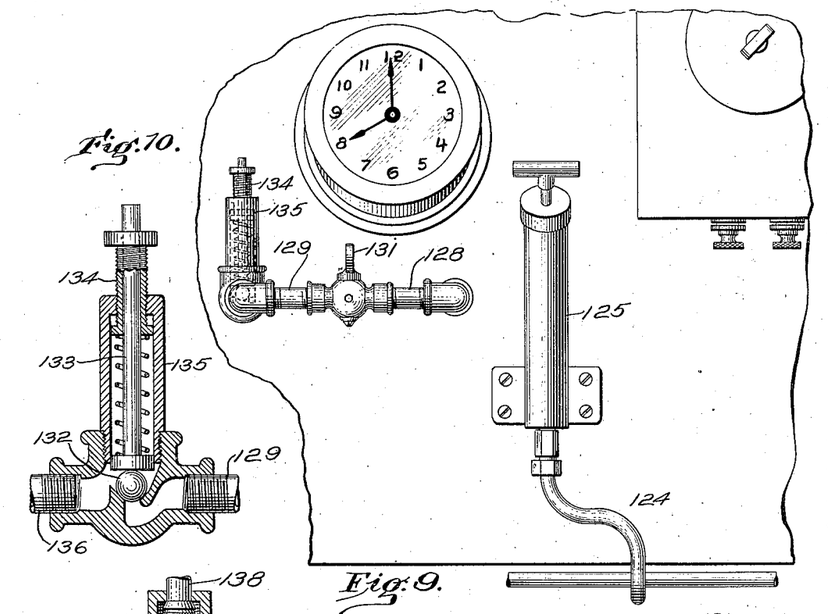
Fig. 9 is a view on enlarged scale, of the dashboard as it appears looking from the the seat of the operative.
Fig. 10 is a section of the ball check valve in the auxiliary supply.

The double ball check valve 123 is best shown by Fig. 18, wherein the two balls 126 and 127 are disposed one each side of the pipe 124 leading to the pump, the construction being such that upon the suction stroke of the pump, liquid fuel will pass through the pipe 122, lift the ball 126 and pass into the pipe 124, the ball 127 at such times remaining on its seat and on the expelling force of the pump, the ball 126 will be seated and the ball 127 lifted to permit the liquid to pass into a pipe 128 to the front of the dashboard 92, (Figs. 9 and 14). The pipe 128, (Figs. 9 and 11) connects with a pipe 129 by a three way cock 130, (Figs. 11) having a handle 131, (Figs. 9 and 14). Connected to the pipe is a ball valve 132 (Fig. 10) which is normally held to its seat by a spring plunger 133, the effective force of the spring being adjustable by means of the sleeve 134 screw-threaded to the plunger chamber 135. The fuel after passing the ball valve 132 passes into the pipe 136 leading to the front of the dashboard 92 (Figs. 12 and 16), where it then passes a second ball valve into the auxiliary supply pipe 138, (Figs. 12, 14 and 16), which is connected by pipes 88, as before described to each of the cylinders.

From the construction described, it will be noted that if the three way cock 130 be turned clock-wise (Fig. 11) to connect pipes 128 and 129 and the pump 125 be operated, liquid fuel will be drawn from the tank 119 (Fig. 1), on the upstroke of the pump and forced through the ball valves described into the auxiliary supply pipe 138 to fill the same. If now the three way cock be turned to close communication between the pipes 128 and 129 by a contra-clockwise movement to bring the solid part of the valve opposite the opening leading to pipe 129, it will be apparent that the suction of the engine cannot draw fuel from the auxiliary supply on account of the vacuum that would be produced in the auxiliary supply. If, however, upon starting the engine by hand, the three way cock be turned into the position indicated by Fig. 11, air will be permitted to pass into the auxiliary supply and thus allow the engine suction to draw a supply of liquid fuel.

Inasmuch as the supply of fuel drawn to the engine on the first few strokes through the carbureter is small as compared with the amount of air furnished, it will be seen that the additional fuel drawn from the auxiliary supply at such times, in the manner described, will enrich the mixture and form a proper mixture for effective combustion. The spring seated ball valve 132, (Fig. 10), will control the amount of fuel by regulating the force necessary to lift the said valve and the several ball valves will effectively prevent back-pressure by the engine through the auxiliary supply.

Figures 2, 3:
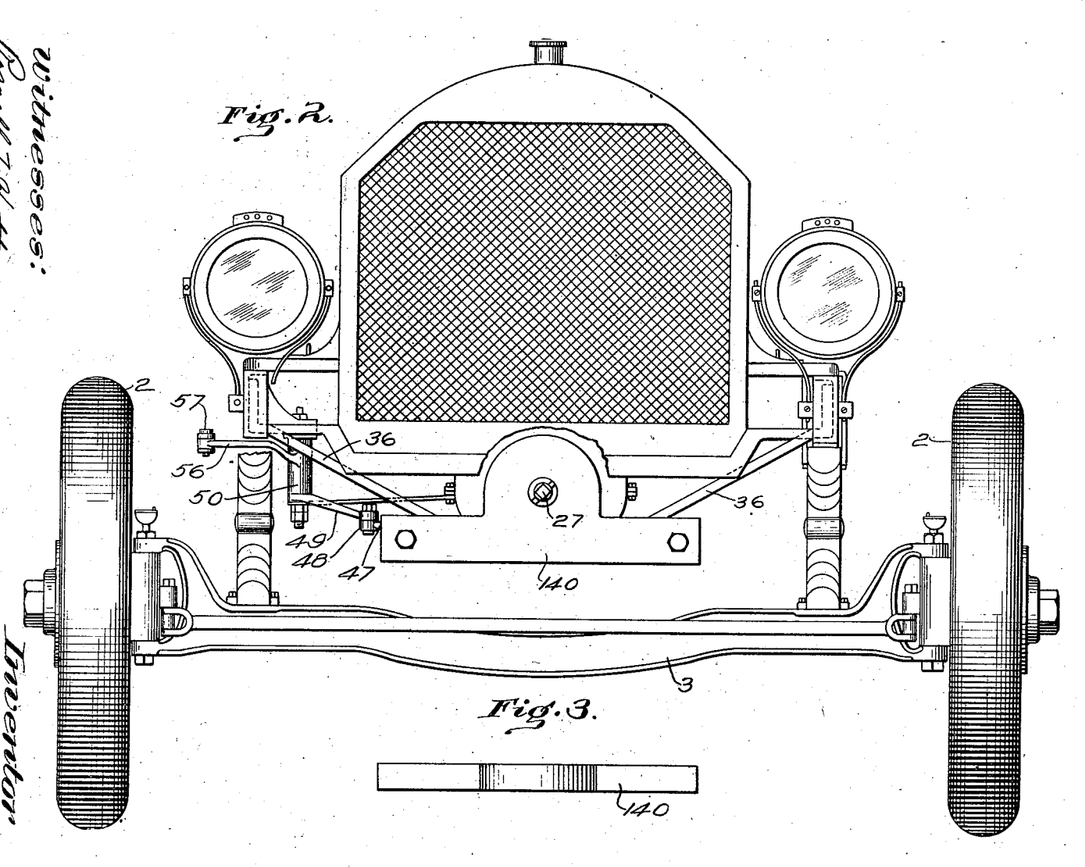
Fig. 2 is an end view of the automobile looking at the front.
Fig. 3 is a detail detached view showing a form of casing to protect certain of the parts.

In order to protect the starting device from dust and dirt a hood 140, (Figs. 2 and 3), may be employed to incase the same.

While the invention has been described with respect to certain details for carrying it into practical effect, said details constitute only one form or embodiment of the invention, and it is to be understood that these details may be modified and varied in form and character without departing from the true scope of the invention.

What I claim is:—

1. In a combustion engine, the combination of a crank shaft, a toothed wheel adapted to be clutched to said crank shaft, an actuator for said toothed wheel comprising a longitudinally movable rack-bar extending transversely of the crank shaft, means for positively moving the rack-bar longitudinally, and means for causing the rack-bar to move into engagement with the toothed wheel as said bar is moved longitudinally in one direction and to be automatically disengaged from the toothed wheel and free the latter when movement of the rack-bar is reversed at any point of its traverse by reverse rotation of said toothed wheel.

2. In a combustion engine, the combination of a crank shaft, a toothed wheel adapted to be clutched to said crank shaft when turned in one direction, an actuator for said toothed wheel for turning it in said direction, said actuator comprising a rack-bar extending transversely of the crank shaft, means for positively moving the rack-bar longitudinally in both directions, a sliding member, and connections between the sliding member and rack-bar for causing the rack-bar to engage and operate the toothed wheel when the rack-bar is moved by said means longitudinally in one direction and to be automatically disengaged from said toothed wheel and free the latter when movement of the rack-bar is reversed at any point of its traverse by said toothed wheel.

3. In a combustion engine, the combination of a crank shaft, a toothed wheel for turning said crank shaft, an actuator for said toothed wheel comprising a toothed member and a second member, said members being bodily movable relatively and conjointly transversely of the crank shaft, means for causing the toothed member to engage the toothed wheel as said member is moved bodily transversely of the crank shaft in one direction relatively to the second member and to move out of engagement from said toothed wheel when moved bodily transversely of the crank shaft in the opposite direction, and means for moving the toothed member bodily transversely of the crank shaft relative to the second member and then move both of said members bodily transversely of the crank shaft.

4. In a combustion engine, the combination of a crank shaft, a toothed wheel for turning said crank shaft, an actuator for said toothed wheel comprising a toothed member and a second member, said members being bodily movable relatively and conjointly transversely of the crank shaft, means for causing the toothed member to engage the toothed wheel as said member is moved bodily transversely of the crank shaft in one direction relatively to the second member and to move out of engagement from said toothed wheel when moved bodily transversely of the crank shaft in the opposite direction, and means for retarding free bodily transverse movement of the second member.

5. In a combustion engine, the combination of a crank shaft, a toothed wheel for turning said shaft, a rack-bar longitudinally movable transversely of the crank shaft, means for positively moving said rack bar longitudinally in both directions, a second bar also movable longitudinally transversely of the crank shaft said bars having inclined engaging surfaces for causing the rack bar to engage the toothed wheel when moved longitudinally in one direction by its actuating means and to be disengaged from and free said toothed wheel when moved in an opposite direction either by said operating means or by reverse rotation of said toothed wheel.

6. In a combustion engine, the combination of a crank shaft, a toothed wheel for turning said shaft, a toothed rack bar bodily slidable longitudinally in a direction transversely of the crank shaft, a second bar also bodily slidable transversely of the crank shaft, said bars having inclined engaging surfaces, means connected to the first mentioned bar to move said bars bodily transversely of the crank shaft, and means to restrain free bodily longitudinal movement of the said second bar transversely of the crank shaft.

7. In a combustion engine, the combination of a crank shaft, a toothed wheel for turning said shaft, a toothed rack bar bodily slidable longitudinally in a direction transversely of the crank shaft, a second bar also bodily slidable transversely of the crank shaft, said bars having inclined engaging surfaces, and means connected to the first mentioned bar to move said bars bodily transversely of the crank shaft.

8. In an automobile, the combination of the crank shaft, a clutch for operating said shaft having a toothed wheel, a sliding rack bar at one side of the axis of the crank shaft and having teeth for engaging said toothed wheel, a second bar, said bars having inclined engaging surfaces, means operative from the driver's seat for positively moving the rack bar bodily transversely of the crank shaft and relative to the second bar and to then move both of said bars bodily transversely of the crank shaft.

9. In an automobile, the combination of the crank shaft, a clutch for operating said shaft having a toothed wheel, a sliding rack bar at one side of the axis of the crank shaft and having teeth for engaging said toothed wheel, a second bar, said bars having inclined engaging surfaces, means operative from the driver's seat for positively moving the rack bar bodily transversely of the crank shaft and relative to the second bar and to then move both of said bars bodily transversely of the crank shaft, and means for retarding free bodily movement of the said second bar.

10. In a combustion engine, the combination of a crank shaft, a clutch for operating said shaft having a toothed wheel, an actuator for said clutch comprising a toothed member and a second member, said members being relatively and conjointly movable bodily transversely of the crank shaft, means for causing the toothed member to engage the tooth clutch wheel when said member is moved bodily relatively to the second member in one direction transversely of the crank shaft, means for thus relatively moving said toothed member and then moving both of said members bodily transversely of the crank shaft to operate the clutch and crank shaft, said first-named means acting automatically to separate the toothed member from the toothed wheel when the engine kicks back.

11. In a combustion engine, the combination of a crank shaft, a clutch having a toothed wheel and connected to the crank shaft, an actuator for said clutch comprising a toothed slide member and a second slide member, said members having reversely inclined engaging surfaces, means for bodily sliding the toothed slide member transversely of the crank shaft and relative to the second slide member to engage the toothed slide member with the toothed wheel of the clutch, and means for guiding the bodily sliding movement of said toothed slide member transversely of the crank shaft.

12. In a mechanical starter for combustion engines, the combination of a clutch having a toothed wheel, the teeth of which are champered away at the top, and an actuator comprising a rack-bar and a sliding member both of which are longitudinally movable, means for positively moving the rack-bar longitudinally, and connections between the rack-bar and sliding member causing the rack-bar when operated in one direction by said means to engage and operate the toothed wheel and to become automatically disengaged from operative connection with said toothed wheel at any point in the traverse of the rack-bar when moved in the reverse direction.

13. In a mechanical starter for combustion engines, the combination of a crankshaft, a toothed wheel adapted to be operatively connected with said crank-shaft, an actuator for said toothed wheel comprising a rack-bar 44 and a slide member 38 both longitudinally movable transversely of the crank-shaft, means for positively moving the rack-bar longitudinally transversely of the crank-shaft and with respect to the slide member 38 in one direction to cause the rack-bar 44 to engage the toothed wheel, and means for causing the rack-bar to become disengaged from and to free the toothed wheel upon wheel-induced movement of the rack-bar in the opposite direction.

14. In a mechanical starter for automobiles, the combination of a crank shaft, a toothed wheel adapted to be operatively engaged therewith, a bar having rack teeth and extending transversely of the crank shaft, a second bar also extending transversely of the crank shaft, a guide for said bars at one side of the axis of the crank shaft and extending transversely thereto, means operative from the driver's seat for positively moving said bars relatively and conjointly transversely of the crank shaft, and means for causing the teeth of the rack bar to engage the toothed wheel when the bars are moved relatively in one direction and for disengaging and freeing the toothed wheel upon wheel-induced movement of the rack-bar longitudinally in the opposite direction.

15. In an automobile, the combination of a crank shaft, a toothed wheel adapted to be operatively connected to said shaft, a guide extending transversely of the machine frame, a rack bar extending transversely of the machine frame and having teeth adapted to engage said toothed wheel, a second bar also extending transversely of the machine frame, said bars being movable transversely of the machine frame and directed in such movement by said guide, means for positively moving said bars relatively and conjointly from the driver's seat, and means to cause the teeth of the rack bar to engage the toothed wheel when said bars are moved relatively lengthwise in one direction, and to then move conjointly lengthwise to operate said toothed wheel and to free the rack-bar from the tooth wheel at any point in the traverse of said rack-bar when the rack-bar movement is reversed.

16. In an automobile, the combination of a crank shaft, a toothed wheel adapted to be operatively connected to said shaft, a guide extending transversely of the machine frame, a rack bar extending transversely of the machine frame and having teeth adapted to engage said toothed wheel, a second bar also extending transversely of the machine frame, said bars being movable transversely of the machine frame and directed in such movement by said guide, means for positively moving said bars relatively and conjointly from the driver's seat, means to cause the teeth of the rack bar to engage the toothed wheel when said bars are moved relatively lengthwise in one direction and to then move conjointly lengthwise to operate said toothed wheel, and means to retard free lengthwise movement of said second bar.

17. In an automobile, the combination of the crank shaft, a toothed wheel operatively connected to said shaft, a guide extending transversely of the machine frame at one side of the axis of said shaft, a rack bar having teeth adapted to engage said toothed wheel, a second bar, said bars extending transversely of the machine frame and sustained by said guide, means for confining the said second bar to lengthwise movement, connections between said bars permitting the rack bar to move lengthwise and toward and from said second bar, and means for positively moving said rack bar lengthwise.

18. In an automobile, the combination of a crank or engine shaft, a toothed wheel operatively connected to said shaft to rotate the same in one direction, a rack bar having teeth adapted to engage the toothed wheel and movable bodily lengthwise transversely of the crank shaft, means operative from the driver's seat for positively moving said rack bar lengthwise in either directions, and means acting upon initial movement of the rack bar lengthwise to engage the teeth thereof with the toothed wheel and upon further movement of the rack bar lengthwise to turn said wheel, and operating upon reverse movement of the toothed wheel at any point in the traverse of the rack-bar to disengage the toothed wheel and rack-bar.

19. In an automobile, the combination of a crank or engine shaft, a toothed wheel operatively connected to said shaft to rotate the same in one direction, the teeth of said wheel being chamfered or cut away at the top, a rack bar having teeth adapted to engage the toothed wheel and movable bodily lengthwise transversely of the crank shaft, means operative from the driver's seat for positively moving said rack bar lengthwise in either directions, and means acting upon initial movement of the rack bar lengthwise to engage the teeth thereof with the toothed wheel and upon further movement of the rack bar lengthwise to turn said wheel, and operating upon reverse movement of the toothed wheel at any point in the traverse of the rack-bar to disengage the toothed wheel and rack-bar.

20. In a combustion engine, the combination of the crank shaft, a clutch associated therewith and having a toothed wheel, an actuator formed of two lengthwise movable bars, one of said bars being movable in a longitudinal direction only, a friction device to restrain free longitudinal movement of said bar, the other of said bars being provided with teeth and movable longitudinally with relation to and also conjointly with said first-named bar, means for causing the toothed bar to move bodily toward the toothed wheel and on restraint of said bodily movement to move longitudinally with the said first-named bar, and means for operating said bars.

21. In a combustion engine, the combination of a crank shaft, a clutch having a toothed wheel, an actuator comprising two independently and conjointly movable sliding members, one of said members being restrained for lengthwise movement only in a direction transversely of the crank shaft, and the other of said members having a lengthwise movement independent of the first-named member, and provided with teeth, means for causing said toothed member to move in a direction away from said first-named member when moved lengthwise independent thereof in one direction to engage the toothed wheel, and to move in a direction toward the first-named member when moved lengthwise independent thereof in the opposite direction, and means for moving the toothed member and through it the first-named member.

22. In a combustion engine, the combination of a crank shaft, a clutch associated therewith for rotating said shaft in one direction, a compound slidable actuator for said clutch comprising a rack-bar and a slide bar, rack-bar operating means for positively reciprocating said rack-bar, and connections between the rack-bar and slide-bar for causing the rack-bar to be operatively connected with the clutch upon positive movement of the rack-bar in one direction by said means and to be automatically disengaged from operative connection with the clutch at any point in the traverse of the rack-bar by reverse rotation of said clutch.

23. In a combustion engine, the combination of a crank shaft, a clutch associated therewith for rotating said shaft in one direction, a compound slidable actuator for said clutch comprising a rack-bar and a slide-bar, rack-bar operating means for positively reciprocating said rack-bar, connections between the rack-bar and slide-bar for causing the rack-bar to be operatively connected with the clutch upon positive movement of the rack-bar in one direction by said means and to be automatically disengaged from operative connection with the clutch at any point in the traverse of the rack-bar by reverse rotation of said clutch, and a guide for supporting the slide-bar and directing the longitudinal movements of the slide-bar and rack-bar.

24. In a combustion engine, the combination of an engine shaft, a guideway extending transversely of said shaft, a sliding actuator movable in said guideway, including a longitudinally movable rack-bar, operating means for positively moving the rack-bar longitudinally, means acting as the rack-bar is moved longitudinally in one direction to cause said rack-bar to be operatively engaged with the engine shaft and acting to cause operative disengagement of the rack-bar and engine shaft at any point in the traverse of the rack-bar upon engine shaft induced movement of the rack-bar in the opposite direction against the stress of said rack-operating means.

25. In a combustion engine, the combination of an engine shaft, a guideway extending transversely of said shaft, a sliding actuator movable transversely of the shaft in said guideway, means for causing said actuator to be operatively connected to said shaft when moved in one direction and to be disengaged from operative relation with said shaft when actuated longitudinally by crank-shaft-induced movement in the opposite direction at any point in the traverse of the actuator and means operated manually for positively moving said sliding actuator lengthwise in either direction.

26. In an automobile, the combination of a crank or engine shaft, a toothed wheel operatively related thereto to turn said shaft in one direction, a rack bar having teeth to engage and operate said toothed wheel, a lever operative from the driver's seat, positive connections between said lever and said rack bar for positively moving it lengthwise transversely of the crank shaft, a fixed guide extending transversely of the crank-shaft, a slide confined to longitudinal movement in said guideway, coöperating inclines between the rack-bar and slide to cause the teeth of the rack-bar to engage the toothed wheel as the rack-bar is positively moved in one direction by its operating lever and acting to free the rack-bar from operative engagement with the toothed wheel upon toothed wheel-induced movement of the rack-bar in the opposite direction.

In testimony whereof, I have signed my name to this specification, in the presence of two subscribing witnesses.

FRANCIS ARTHUR MILLS.

Witnesses:
 CHARLES W. McDERMOTT,
 BEATRICE I. SMITH.

Copies of this patent may be obtained for five cents each, by addressing the "Commissioner of Patents, Washington, D. C."